United States Patent [19]

Beilke et al.

[11] 3,746,195
[45] July 17, 1973

[54] LOWERING BED TRAILER
[75] Inventors: James E. Beilke; Edward W. Schulke, both of Alexandria, Minn.
[73] Assignee: said Clifford L. Peters by said Edward W. Schulke, Alexandria, Minn.
[22] Filed: Sept. 20, 1971
[21] Appl. No.: 182,091

Related U.S. Application Data
[63] Continuation of Ser. No. 872,524, Oct. 30, 1969.

[52] U.S. Cl............ 214/506, 280/43.11, 280/43.18
[51] Int. Cl............................................. B60p 1/28
[58] Field of Search............................ 214/505, 506; 280/43.11, 43.18, 43.19, 111, 112, 414 A

[56] References Cited
UNITED STATES PATENTS
2,740,543  4/1956   Mounsdon et al................. 214/506
2,610,865  9/1952   Cantrell........................... 280/43.18
2,876,922  3/1959   Holiday............................ 214/506
3,065,871  11/1962  Schramm......................... 214/506
2,860,800  11/1958  Wilson et al..................... 214/506
2,478,795  9/1949   Whalen et al................... 280/43.18
2,719,726  10/1955  Johnston.......................... 280/43.18

Primary Examiner—Albert J. Makay
Attorney—Burd, Braddock & Bartz

[57] ABSTRACT

A trailer having a rectangular frame carrying a flat floor for supporting a machine or other objects, as a snowmobile. Secured to the longitudinal center of the frame and positioned over the floor, is an elongated tongue, adapted to be connected to a towing vehicle. Pivotally mounted on opposite sides of the midportion of the frame are wheel and support assemblies operable to lower and raise the frame. Each wheel and support assembly has a transverse member rotatably mounted on the bottom of the center of the frame. A forwardly directed arm secured to the member carries a wheel positioned forwardly from the transverse member. The arm has a beam carrying a forwardly projected leaf spring. The forward or free end of the spring is turned into a transverse tubular shape to receive a U-shaped spring biased holding means. A fender, located over the wheel, is secured to the beam.

15 Claims, 6 Drawing Figures

Patented July 17, 1973

INVENTORS
EDWARD W. SCHULKE
JAMES E. BEILKE
BY Burd Braddock & Bartz
ATTORNEYS

Patented July 17, 1973

INVENTORS
EDWARD W. SCHULKE
JAMES E. BEILKE
BY
Burd Braddock & Bailey

ATTORNEYS

LOWERING BED TRAILER

This is a continuation of application Ser. No. 872,524 filed Oct. 30, 1969.

BACKGROUND OF INVENTION

Numerous trailer supporting structures have been developed to change the elevation of the trailer frame for loading and transporting objects by trailer. These structures utilize a pair of levers which are connected together to carry the wheels. Both of the levers must be released and moved together to an upright position to lower the trailer frame. An example of this structure is shown in U.S. Pats. No. 2,442,071, No. 2,478,795 and No. 2,740,543. These trailers do not have independent wheel suspension, as the levers attached to the wheels are connected together. In addition, the entire load on the trailer must be raised when elevating the trailer frame. This produces unequal loads on the levers and substantial torsion forces on the interconnecting rod or yoke. Alternatively, two people are required to raise the trailer if loaded with a substantial load.

SUMMARY OF INVENTION

The invention relates to a tilt bed trailer having a frame carrying a forwardly directed tongue, or bar, adapted to be attached to the towing vehicle. Independent wheel assemblies are mounted on opposite sides of the midsection of the frame. Each wheel assembly has a forwardly directed arm having a rear portion rotatably mounted on a midsection of the frame and a front portion adapted to be releasably connected to the front section of the frame. Intermediate the front and rear portions of the arm is an outwardly directed axle carrying a wheel means. The arm includes a forwardly projected spring to provide the trailer frame with resilient suspension. Each wheel assembly acts independently of each other to provide independent resilient suspension for the trailer frame. In addition, each wheel assembly can be released from the front of the trailer frame to independently lower each side of the trailer frame. A spring biased holding means releasably connects the forward end of the spring to the front portion of the frame. As another feature of the invention, the holding means comprise a U-shaped member having an elongated transverse rod. Biasing means, acting on the U-shaped member, function to bias the U-shaped member into its operative holding position with the end of the spring.

IN THE DRAWINGS

Figure 1:
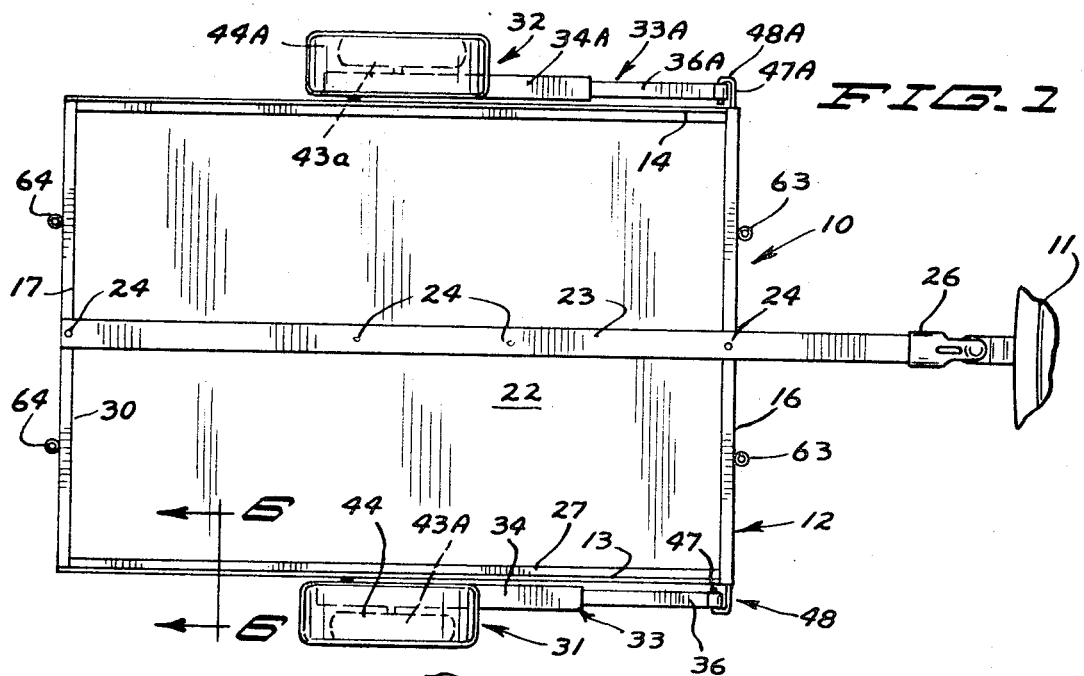
FIG. 1 is a top plan view of the trailer of the invention.
Figure 3:
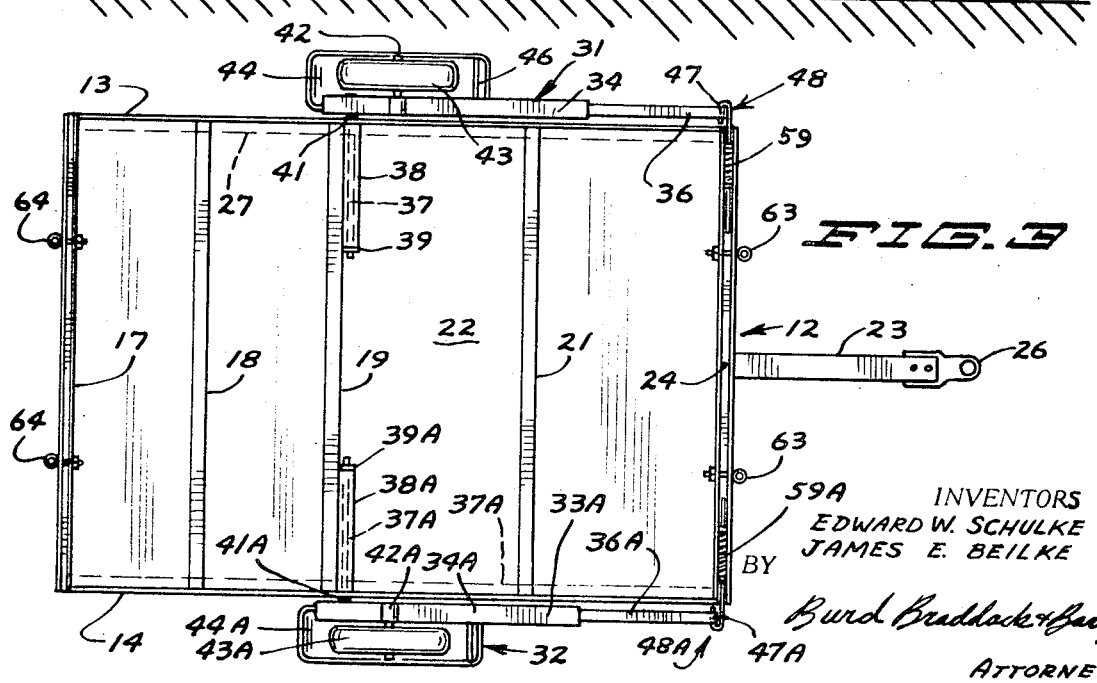
FIG. 3 is a bottom plan view of the trailer of FIG. 1.

Referring to the drawings, there is shown in FIG. 1 a trailer of the invention, indicated generally at 10, connected to the back of a towing vehicle 11, as a car, pick-up truck, tractor, or the like. Trailer 10 has a rectangular frame, indicated generally at 12, comprising spaced generally parallel side members 13 and 14 having forward portions connected together with a front cross member 16 and rear portions connected together with a rear cross member 17. The cross members 16 and 17 are inverted U-shaped or channel members which are secured by welds, or the like, to the side members. As shown in FIG. 3, a plurality of intermediate cross members 18, 19, and 21 are connected to intermediate portions of the side members 13 and 14. The cross member 19 is slightly to the rear of the center of the frame. The entire frame is covered with a flat floor 22 made of wood, plywood, or like rigid material. The floor 22 is secured to the side members 13 and 14 and the cross members 18, 19, and 21 with fasteners, as screws, bolts and the like.

Returning to FIG. 1, the trailer 10 has, extended longitudinally across the top of the center of the floor 22, a linear tongue 23. The front section of tongue 23 projects forwardly from the front cross member 16. A plurality of fasteners 24, as bolt and nut assemblies, attach the tongue 23 to all the cross members. A hitch 26, as the conventional ball hitch, is attached to the forward end of the tongue 23. This hitch is adapted to be releasably connected to the conventional ball structure attached to the rear of the towing vehicle 11. Other types of hitches can be used to releasably attach the tongue to the towing vehicle 11.

Figure 6:
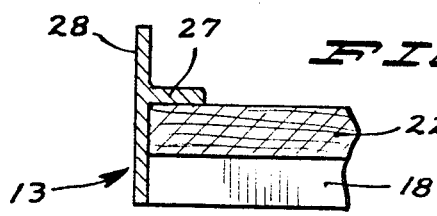
FIG. 6 is an enlarged sectional view taken along the line 6—6 of FIG. 1.

As shown in FIG. 6, the side frame 13 has an inwardly directed longitudinal flange 27 positioned over the edge of the floor 22 to retain the floor in engagement with the cross member 18. Projected upwardly from the side of the flange 27 is an upright linear rib 28 providing the trailer with a low side wall extended upwardly from the flat plane of the top of the floor 22. The front cross member 16 and rear cross member 17 have similar flanges 29 and 30 which cover the front and rear edges of the floor to protect the floor and retain the floor adjacent the cross members. The side member 14 has similar inwardly directed flange and upright rib.

Figure 2:
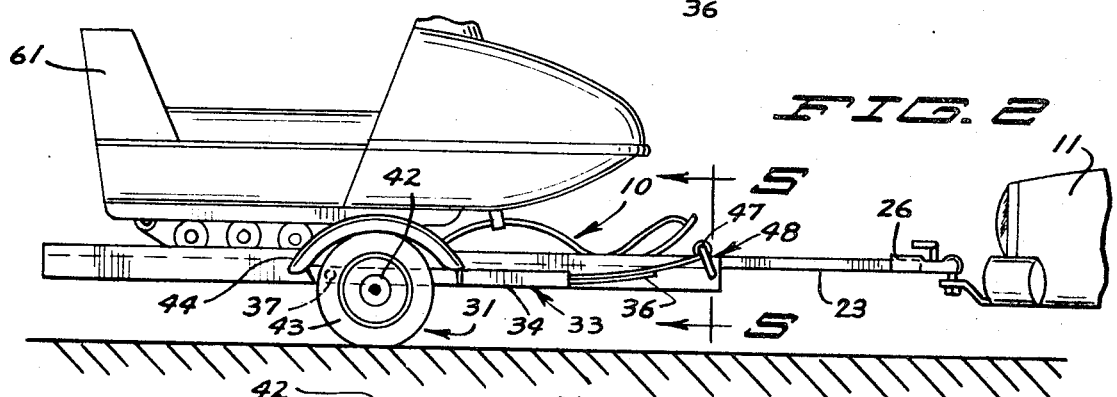
FIG. 2 is a side view of the trailer of the invention carrying a snowmobile.

The frame 12 is supported on the ground by separate and independent wheel and support assemblies, indicated generally at 31 and 32, operatively attached to opposite sides of the frame, generally at the midportion of the frame. The wheel support assemblies 31 and 32 are substantially identical in structure and function. The parts of wheel assembly 31 that are identical with the parts of wheel assembly 32 are identified with the same reference number having the suffix A. As shown in FIGS. 1 to 3, wheel and support assembly 31 has an elongated linear arm, indicated generally at 33, located closely adjacent the side member 13. The arm 33 comprises a rigid box beam 34 secured to a forwardly directed flat leaf spring 36. Secured to the rear of beam 34 is an inwardly directed transverse rod, or shaft, 37 rotatably located in an elongated transverse sleeve 38. The sleeve 38 is secured by welds to the side member 13 and the cross member 19. A collar, mounted on the inner end of rod 37 which projects through the sleeve 38, holds the rod 37 in assembled relation with the sleeve 38. The sleeve 38 has a length approximately one-third of the width of the trailer frame. The rod 37, rotatably positioned within the sleeve, projects through a hole in side member 13. A spacer washer 41 is located around rod 37 between the beam 34 and the side member 13 to locate the beam a short distance outwardly from the side member 13. Secured to the bottom of the beam 34, approximately in alignment with the midportion of the side member 13, is an outwardly directed axle 42 rotatably carrying a wheel 43 having a pneumatic tire. Located over the wheel 43 is a curved generally inverted U-shaped fender 44. The rear portion of the fender 44 is attached directly to the rear of the beam 34. A flat outwardly directed bar 46, secured to the side of the beam 34, is attached to the front edge of the fender.

Figure 4:
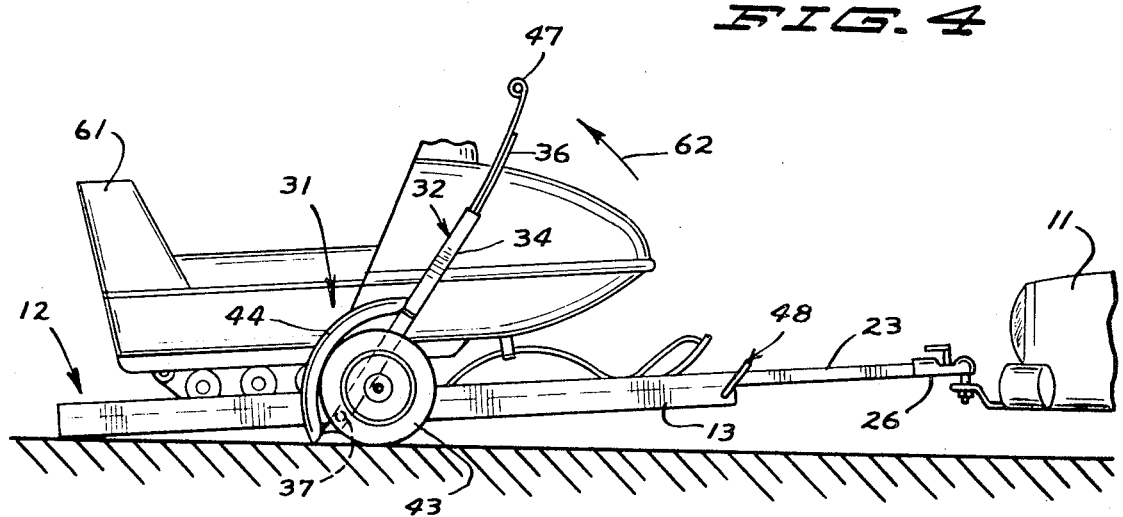
FIG. 4 is a side view, similar to FIG. 2, showing the trailer frame in the lowered position.
Figure 5:
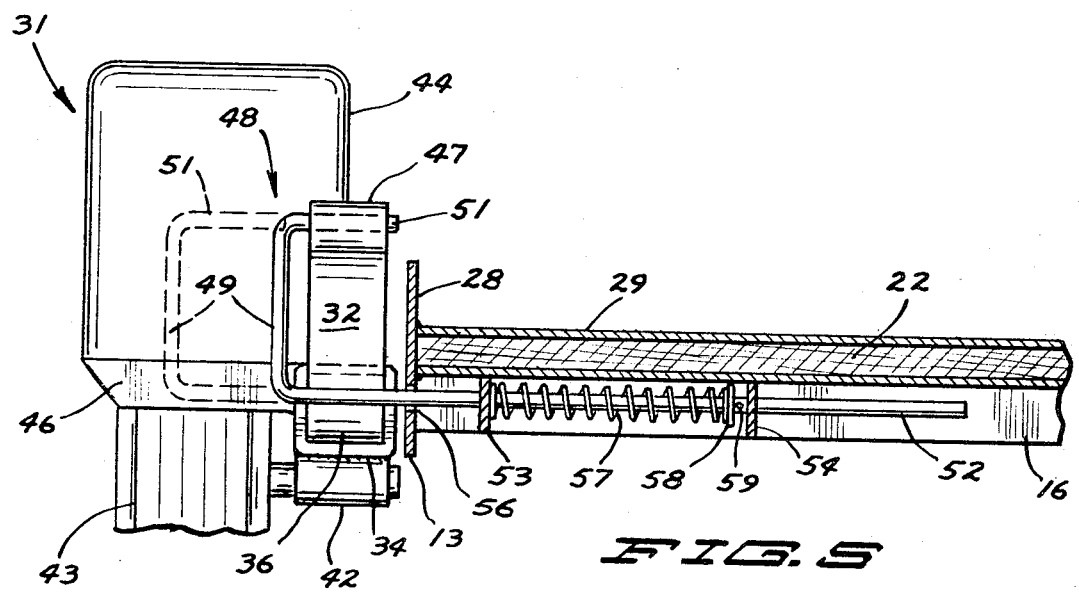
FIG. 5 is an enlarged sectional view taken along the line 5—5 of FIG. 2.

The spring 36 comprises a flat resilient bar with a rolled, or cylindrical, forward or free end 47. Additional flat bars may be located in side-by-side relationship to provide a leaf-type spring. The spring 36 extends or telescopes into the box beam and is attached by welds to the beam. The spring 36 has a length slightly shorter than the beam 34 with the front rolled end in general alignment with the front of the frame making the length of the arm 33 longer than one-half of the length of the frame. A holding device, indicated generally at 48, is releasably attached to the spring 36 to hold the arm 33 in a generally horizontal position adjacent the outside of the side member 13. Referring to FIG. 5, holding device 48 comprises a generally U-shaped member 49 having a short transverse horizontal leg 51 and a long transverse horizontal leg 52. The leg 52 extends through suitable holes in tabs or stops 53 and 54 secured to the channel-shaped cross beam 16. The side member 13 has a hole 56 in transverse alignment with the holes in the tabs 53 and 54, whereby the leg 52 is free to slide in a transverse direction, shown in broken lines in FIG. 5, to withdraw the short leg from in the transverse hole in the cylinder 47. This releases the arm 32, permitting it to move in an upward direction, as indicated by arrow 62 in FIG. 4 to lower the frame 12. The U-shaped member 49 is biased toward the side member 13 with a coil compression spring 57 surrounding a portion of the leg 52 between the stops 53 and 54. The inner end of the coil spring 57 engages a washer 58 located adjacent a pin 59 extended through the rod 52. Upon movement of the U-shaped member 49 into its "out" or dotted line position, as shown in FIG. 5, the spring 57 will compress and thereby continuously bias the U-shaped member back into its locked position adjacent the side member 13. The holding device 48A us constructed in an identical manner to continuously bias the short leg of the member to a position to retain the short leg in the transverse hold in spring cylinder 47A.

In use, the floor 22 is divided into two separate areas by the tongue 23. A snowmobile 61 can be parked in each of the areas. The upright flange 28 of the side member 13 and the upright side wall of the tongue 23 limit any lateral movement of the snowmobile on the trailer. The wheel and support assemblies 31 and 32 function independently to resiliently support opposite sides of the trailer frame and are consecutively operable to lower the rear of the trailer frame to provide for a convenient loading of the snowmobile on the floor 22. As shown in FIG. 4, the holding device 48 is released from the free end of the spring 36. This is accomplished by pulling the holding device in an outward direction to release the top or short leg 52 from the cylinder 47 on the end of the spring 36. The arm 32 will move upwardly with the wheel 43 acting as a fulcrum. The shaft 37, being attached to the beam rearwardly from the axle 42, lowers the frame 12 as the forward portion of the arm is raised. With the hitch 26 attached to the connecting structure on the back of the vehicle 11, the rear of the trailer will engage the ground. The opposite side of the trailer is lowered in an identical manner. This is accomplished by releasing the holding device 48A and allowing the arm 33A to move to a generally upright position.

The trailer frame 12 is returned to its raised transport position by separately raising the arms 32 and 32A and connecting their free ends thereof to the holding devices 48 and 48A. The U-shaped member 49 is pulled to an outright position to align the short leg 51 with the hole in the culinder 47. Upon releasing the force on the U-shaped member 49, the short leg 51 is moved by the biasing force of the spring 59 into the hole. The spring 59 continues to retain the leg 51 in assembled relation with the spring 36 to hold the arm in the raised transport position.

This description is directed to the preferred structure of the invention. Modifications, changes in material and design can be made without departing from the invention. For example, the trailer can be used to transport golf carts, garden and farm implements, and like portable items. The tongue 23 can be located under and secured to the bottom of the frame 12 so that the floor 22 has a flat one area surface for carrying larger loads. The rotatable mountings of the shafts 37 and 37A on the frame 12 can be longitudinally located on the frame to balance the trailer when loaded. This mounting is positioned on the frame at a location to balance a particular load on the trailer. Trailers designed for two snowmobiles have the shaft mountings approximately at the middle of the trailer frame. Movement of the mountings toward the rear of the frame provides increased leverage as the arms are longer.

The embodiments of the invention in which an exclusive property or privilege is claimed are defined as follows:

1. A trailer comprising: a frame, a forwardly directed tongue attached to the frame, said tongue having means for releasably attaching the tongue to a towing vehicle, a first wheel and support assembly having first transverse means pivotally mounted on one side of the frame, a longitudinal first arm attached to the first means located adjacent the side of the frame, an outwardly directed first axle secured to the first arm forwardly of the first means, first wheel means rotatably mounted on the first axle, a forwardly directed first spring secured to the free ends of the first arm forming an extension of the first arm, first holding means releasably connecting the forward end of the first spring to the front portion of the frame, a second wheel and support assembly having a second transverse means pivotally mounted on the opposite side of the frame, said second transverse means being independent of and spaced from the first transverse means and movable independently of the first transverse means whereby the second wheel and support assembly is movable relative to the frame independently of the first wheel and support assembly, a longitudinal second arm attached to the second means located adjacent the opposite side of the frame, an outwardly directed second axle secured to the second arm forwardly of the second transverse means, second wheel means rotatably mounted on the second axle, a forwardly directed second spring secured to the free end of the second arm forming an extension of the second arm, second holding means releasably connecting the forward end of the second spring to the forward end of the frame whereby said first arm and second arm act as separate and independent suspension structures for the trailer, said arms and springs when released by removal of the first and second holding means from the forward end of the frame will swing independently upwardly to lower each side of the frame, and when moved from an upright position to a generally horizontal position will raise each side of the frame.

2. The trailer of claim 1 wherein: the frame has longitudinal side members, a plurality of spaced cross members secured to the side members and a floor covering attached to the cross members, said first and second transverse means being connected to midportions of the side members and a middle cross member.

3. The trailer of claim 1 wherein: the first transverse means and the second transverse means both comprise separate transverse tubular members secured to opposite sides of the frame, separate rods rotatably located in the tubular members, and means to hold the rods in assembled relation with the tubular members, one of said rods being attached to the first arm and the other of said rods being attached to the second arm.

4. The trailer of claim 1 wherein: each of said first holding means and second holding means have a generally U-shaped member for restraining the end of the spring associated with the holding means and means for holding the U-shaped member in a position whereby said U-shaped member is in a position to restrain the movement of the spring.

5. A trailer comprising: a frame, a forwardly directed tongue attached to the frame, said tongue having means for releasably attaching the tongue to a towing vehicle, a first wheel and support assembly having first transverse means pivotally mounted on the frame, a longituidnal first arm attached to the first means located adjacent the side of the frame, an outwardly directed first axle secured to the first arm forwardly of the first means, first wheel means rotatably mounted on the first axle, said first arm having a forwardly directed first spring, first holding means releasably connecting the forward end of the first spring to the front portion of the frame, a second wheel and support assembly having a second transverse means pivotally mounted on the frame independent of the first means, a longitudinal second arm attached to the second means located adjacent the opposite side of the frame, an outwardly directed second axle secured to the second arm forwardly of the second transverse means, second wheel means rotatably mounted on the second axle, said second arm having a second forwardly directed spring, second holding means releasably connecting the forward end of the second spring to the forward end of the frame whereby said first arm and second arm act as independent suspension structures for the trailer, said arms when released from the forward end of the frame will swing independently upwardly to lower the frame, and when moved from an upright position to a generally horizontal position will raise the frame, said first and second transverse means comprise separate transverse tubular members secured to the frame, separate rods rotat-ably located in the tubular members, and means to hold the rods in assembled relation with the tubular members, one of said rods being attached to the first arm and the other of said rods being attached to the second arm.

6. The trailer of claim 5 including: fender members located over the first wheel means and second wheel means, said fender members being secured to the first and second arms.

7. The trailer of claim 5 wherein: each of said first holding means and second holding means have a generally U-shaped member for restraining the end of the spring associated with the holding means and means for holding the U-shaped member in a position whereby said U-shaped member is in a position to restrain the movement of the spring.

8. The trailer of claim 5 including: a floor secured to the frame, said tongue being located over the floor and attached to the midsections of said frame.

9. The trailer of claim 5 including: a floor secured to the frame, said tongue located on top of and along the longitudinal center of said floor, said frame having side members with upright ribs on opposite sides of the floor.

10. A trailer comprising: a frame, a forwardly directed tongue attached to the frame, said tongue having means for releasably attaching the tongue to a towing vehicle, a first wheel and support assembly having first transverse means pivotally mounted on the frame, a longitudinal first arm attached to the first means located adjacent the side of the frame, an outwardly directed first axle secured to the first arm at a location spaced from the first means, first wheel means rotatably mounted on the first axle, said first arm having a longitudinally directed first spring, first holding means releasably connecting the forward end of the first spring to a portion of the frame, a second wheel and support assembly having a second transverse means pivotally mounted on the frame independent of the first means, a longitudinal second arm attached to the second means located adjacent the opposite side of the frame, an outwardly directed second axle secured to the second arm at a location spaced from the second transverse means, second wheel means rotatably mounted on the second axle, said second arm having a second longitudinally directed spring, second holding means releasably connecting the forward end of the second spring to a portion of the frame whereby said first and second arms act as independent suspension structures for the trailer, said arms when released from the frame will swing independently upwardly to lower the frame, and when moved from an upright position to a generally horizontal position, will raise the frame and each spring has an end portion, each of said first holding means and second holding means having a leg cooperating with the end portion to conenct the spring to the frame, each leg of said first holding means and second holding means is part of a U-member slidably movable relative to the frame and spring means for biasing the U-member toward the side of the frame whereby said leg is held in assembled relation with the spring.

11. The trailer of claim 10 wherein: the first transverse means and the second transverse means both comprise separate transverse tubular members secured to opposite sides of the frame, separate rods rotatably located in the tubular members, and means to hold the rods in assembled relation with the tubular members, one of said rods being attached to the first arm and the other of said rods being attached to the second arm.

12. The trailer of claim 10 wherein: said spring means is a coil spring surrounding the leg.

13. A trailer comprising: a frame, a forwardly directed tongue attached to the frame, said tongue having means for releasably attaching the tongue to a towing vehicle, a first wheel and support assembly having first transverse means pivotally mounted on one side of the frame, a longitudinal first arm attached to the first means located adjacent the side of the frame, an outwardly directed first axle secured to the first arm at a location spaced from the first means, first wheel means rotatably mounted on the first axle, said first arm having a longitudinally directed first spring forming an extension thereof, first holding means releasably connecting the free end of the first spring to a portion of the frame, a second wheel and support assembly having a second transverse means pivotally mounted on the opposite side of the frame, said second transverse means being spaced from the first transverse means and movable independently of the first transverse means whereby the second wheel and support assembly is movable relative to the frame independently of the first wheel and support assembly, a longitudinal second arm attached to the second means located adjacent the opposite side of the frame, an outwardly directed second axle secured to the second arm at a location spaced from the second transverse means, second wheel means rotatably mounted on the second axle, said second arm having a second longitudinally directed spring forming an extension thereof, second holding means releasably connecting the free end of the second spring to a portion of the frame whereby said first arm and second arm act as independent suspension structures for the trailer, said arms and springs when released by removal of the holding means from the frame will swing independently upwardly to lower each side of the frame, and when moved from an upright position to a generally horizontal position will raise each side of the frame.

14. The trailer of claim 13 wherein: the first transverse means and the second transverse means both comprise separate transverse tubular members secured to opposite sides of the frame, separate rods rotatably located in the tubular members, and means to hold the rods in assembled relation with the tubular members, one of said rods being attached to the first arm and the other of said rods being attached to the second arm.

15. The trailer of claim 13 wherein: each of said first holding means and second holding means have a generally U-shaped member for restraining the end of the spring associated with the holding means and means for holding the U-shaped member in a position whereby said U-shaped member is in a position to restrain the movement of the spring.

* * * * *